(12) United States Patent
Genilloud et al.

(10) Patent No.: US 7,583,304 B2
(45) Date of Patent: Sep. 1, 2009

(54) METHOD OF OBTAINING AN IMAGE USING AN IMAGE SENSOR WITH A BROAD DYNAMIC RANGE

(75) Inventors: Laurent Genilloud, Romont (CH); Pascal Heck, Gland (CH)

(73) Assignee: The Swatch Group Research and Development Ltd, Marin (CH)

( * ) Notice: Subject to any disclaimer, the term of this patent is extended or adjusted under 35 U.S.C. 154(b) by 435 days.

(21) Appl. No.: 11/566,398

(22) Filed: Dec. 4, 2006

(65) Prior Publication Data

US 2007/0132869 A1    Jun. 14, 2007

(30) Foreign Application Priority Data

Dec. 12, 2005    (EP)    .................................. 05111984

(51) Int. Cl.
*H04N 5/335*    (2006.01)
*H04N 3/14*    (2006.01)
(52) U.S. Cl. ........................ 348/294; 348/296; 348/308; 348/362
(58) Field of Classification Search .................. 348/296
See application file for complete search history.

(56) References Cited

U.S. PATENT DOCUMENTS

| | | | | |
|---|---|---|---|---|
| 6,348,681 | B1 * | 2/2002 | Kindt et al. | ............... 250/208.1 |
| 6,522,357 | B2 * | 2/2003 | Beiley et al. | ................. 348/296 |
| 6,600,471 | B2 * | 7/2003 | Lee et al. | ....................... 345/90 |
| 2004/0174754 | A1 * | 9/2004 | Lee et al. | ..................... 365/200 |
| 2004/0196398 | A1 * | 10/2004 | Doering et al. | ............. 348/308 |

FOREIGN PATENT DOCUMENTS

| | | |
|---|---|---|
| EP | 1 128 661 A1 | 8/2001 |
| EP | 1128661 A1 * | 8/2001 |
| WO | 02/11426 A1 | 2/2002 |
| WO | 2004/064386 A1 | 7/2004 |

OTHER PUBLICATIONS

Definition of the term CMOS, printed from http://www.webopedia.com/TERM/C/CMOS.html, printed Nov. 30, 2006, pp. 1-3.
European Search Report issued in corresponding application No. EP 05 11 1984, competed Feb. 13, 2006.

* cited by examiner

*Primary Examiner*—Timothy J Henn
*Assistant Examiner*—Quoc Huynh
(74) *Attorney, Agent, or Firm*—Griffin & Szipl, P.C.

(57) ABSTRACT

A method of obtaining an image uses a broad dynamic range image sensor that includes a photosensitive cell formed of pixels. Each pixel includes a element, a first initialization transistor series connected to the element, storage means coupled to the element, a third initialization transistor series connected to a capacitor, and fourth and fifth series connected transistors, wherein one control terminal of the fourth transistor is connected to the capacitor. The method comprises initializing the capacitor and t-he-photodiode to a first initialization voltage via conduction of the second and third transistors, then making the second transistor non-conductive to start a first long exposure period of the photodiode. At the end of the first exposure period, the first transistor is made conductive to initialize the photodiode to a second initialization voltage to start a second short exposure period. The photodiode voltage level is stored in the capacitor.

8 Claims, 2 Drawing Sheets

METHOD OF OBTAINING AN IMAGE USING AN IMAGE SENSOR WITH A BROAD DYNAMIC RANGE

This application claims priority from European Patent Application No. 05111984.0 filed Dec. 12, 2005, the entire disclosure of which is incorporated herein by reference.

FIELD OF THE INVENTION

The invention concerns a method of obtaining an image using an image sensor with a broad dynamic range.

BACKGROUND OF THE INVENTION

The image sensor can easily be made for example in Complementary Metal Oxide Semiconductor (CMOS) type technology. Such CMOS image sensors are used, for example, for making photographic devices that can be fitted to small sized portable instruments, such as wristwatches. The electric power consumption of each electronic component has to be reduced in these instruments, which are powered by a battery or an accumulator. Consequently, the image sensor has to be made to consume a small amount of electric energy during image taking or processing operations.

Owing to current integration technology, this type of image sensor includes, on the same chip, a photosensitive cell formed of a set of pixels, and a processing component for performing image taking operations and reading the information picked up by the photosensitive cell. The pixels are typically organised in the form of a matrix arranged in rows and columns. The matrix occupies most of the sensor surface. In order to read a particular pixel of the matrix, the corresponding row and column are addressed. The sensor therefore conventionally includes a row addressing circuit coupled to the matrix rows and an output bus coupled to the matrix columns, both controlled by a control circuit.

Photodetector elements of the cell pixels can be formed of p-n junction capacitors of a semiconductor substrate for picking up photons. These junction capacitors are commonly called photodiodes, which have the advantage of being compatible with standard CMOS manufacturing processes.

In normal operation, each photodiode is inversely polarised at a given voltage, for example between 0 and 2 V. The photons picked up by the photodiode discharge one photodiode capacitor generating electron-hole pairs. These electron-hole pairs are collected by opposite electrodes of the capacitor and consequently reduce the voltage gap at the capacitor terminal within a determined dynamic voltage range of the sensor. This dynamic voltage range of the sensor is less than the photodiode polarisation voltage, for example equal to 1.5 V, but this condition is not, however, limiting.

Each pixel of the matrix can possess a structure in conformity with the illustration of FIG. 1, equivalent to the structure of FIG. 2B of EP Patent No. 1 128 661 by the same Applicant, of which the description relating to FIG. 2B and to the method for obtaining an image is incorporated herein by reference. This pixel 1 comprises a element, such as an inversely polarised photodiode PD, storage means, such as a capacitor C1 and five transistors M1 to M5, for example of the n-MOS type. The photodiode collects the electrons photo-generated during an integration or exposure period, whereas the storage means stores the voltage value present at the terminals of photodiode PD during a sampling phase.

Transistor M1 is connected in series with the photodiode between a high electric supply terminal $V_{DD}$ and a low electric supply terminal $V_{SS}$ of a voltage source that is not shown. According to the prior art, this transistor M1, which is controlled by a initialization signal TI across its gate terminal, initializes or resets photodiode PD to a determined voltage before each integration or exposure period.

Transistor M2 connects capacitor C1 to the connection node between transistor M1 and photodiode PD. This transistor M2, which is controlled by a sampling signal SH, samples the charge accumulated by photodiode PD and stores the signal thereby sampled in the capacitor. This transistor M2 also insulates or uncouples photodiode PD and capacitor C1.

Transistor M3 is connected in series with capacitor C1 between the two electric supply terminals $V_{DD}$ and $V_{SS}$. According to the prior art, this transistor M3, which is controlled by a reset or initialization signal RST, initializes the capacitor to a determined voltage.

Transistor M4 is a source follower transistor, whose gate terminal is connected to the connection node between the source terminal of transistor M3 and capacitor C1, and the drain terminal is connected to high electric supply terminal $V_{DD}$. Transistor M4 is arranged in series with transistor M5, which is a row selection transistor. Transistor M5, which is controlled by a row selection signal RSEL, transfers, during the read process, the voltage from transistor M4 onto an output bus common to all the pixels in one column.

With reference to FIG. 2, the conventional method of obtaining an image using an image sensor is described, with the structure of each pixel being shown in FIG. 1. FIG. 2 thus shows a temporal diagram of the evolution of control signals TI, SH, RST and RSEL for operating the pixel structure of FIG. 1, and it shows schematically the evolution of voltage $V_{PD}$ of photodiode PD and the evolution of voltage $V_1$ across capacitor C1.

During a first initialization or reset phase, the first and second initialization signals TI and RST are both brought to a high positive voltage close to $V_{DD}$. In this manner, photodiode PD and capacitor C1 of each pixel are both reset to a determined reset voltage. Sampling signal SH is at a low level such that transistor M2 is not conductive, which enables photodiode PD and capacitor C1 to be uncoupled. Likewise the row selection signal RSEL is at a low level so that row selection transistor M5 is not conductive. The resulting voltages $V_{PD}$ and $V_1$ on photodiode PD and capacitor $C_1$ are then at levels substantially equal to the determined initialization voltage.

At the end of the initialization phase at time t1, the first initialization signal TI passes to a low level making transistor M1 non conductive, which starts the exposure or integration period of photodiodes PD of the image sensor. Via the effect of illumination, photodiodes PD start to discharge proportionally to the quantity of light that each of them receives as shown by the evolution of voltage $V_{PD}$ between t1 and t3. Initialization signal RST is kept in the high state to keep capacitor C1 at a constant voltage level close to $V_{DD}$.

After a determined exposure period at time t2, the second initialization signal RST passes to a low level, thus releasing the memory node in capacitor C1. Sampling signal SH then briefly passes to a high level making transistor M2 conductive. This enables the voltage value present on photodiode PD to be sampled and stored in capacitor C1. Voltage $V_1$ at the terminals of capacitor C1 thus evolves as shown in FIG. 2. At time t3, the sensor exposure period ends. The capacitor of each pixel keeps the photodiode voltage value in its memory as a function of the illumination thereof as soon as transistor M2 is made non conductive.

Once the voltage value has been stored in capacitor C1, the first initialization signal TI is again brought to a level such that each photodiode is again initialized to a voltage substantially equal to the initialization voltage close to $V_{DD}$. The sampled voltage stored in the capacitor of each pixel of the sensor is thus not disturbed by the phenomenon of charge carrier diffusion, so that the voltage present in this capacitor remains constant. A phase of reading the voltage value stored in the capacitor occurs at time t4 for each row of pixels of the sensor in succession.

In a determined exposure period when an image is being taken, the higher the number of photons picked up by each photodiode, the more quickly the photodiode capacitor is discharged. Generally, in the case of strong illumination of the photodiode, the photodiode capacitor is discharged quickly to a minimum voltage value that is a function of the dynamic voltage range of the sensor, which is not illustrated in FIG. 2. Conversely, in the even of low or average (moderate) illumination of the photodiode, the voltage at the photodiode capacitor terminals gives material information as to the image picked up. In order to obtain material information as to the image picked up in strong and weak illumination, at the end of a defined exposure period, the sensor must comprise means for increasing its dynamic voltage range.

In this regard, various methods for increasing the dynamic range of an image sensor have already been proposed. One of the methods consists for example of using digital processing to merge two images taken at different exposure times. As this requires storing an image in the memory, this uses a lot of space in the circuit. This cannot therefore be applied to an image sensor able to be fitted to an instrument of small volume. It is also possible to add several electronic components in the pixels of the photosensitive cell of the image sensor in order to increase the dynamic range. However in that case, this considerably reduces the light collecting surface ratio on the pixel surface, which is a drawback.

One can also cite WO Patent No. 2004/064386, which discloses an image sensor with transfer function control for extending the dynamic range of the sensor. An inversely polarised photodiode is connected in series to an MOS type initialization or reset transistor between two terminals of a power source. This MOS transistor initially charges the photodiode to a first determined initialization voltage close to the high voltage value of the power source. The MOS transistor is then disconnected in order to start a first long exposure period of the photodiode in parallel with a charge storage capacitor. As a function of the level of illumination of the photodiode, the capacitor is discharged more or less quickly during the first exposure period. The maximum that the capacitor can be discharged is to a minimum voltage value defined by the dynamic range of the sensor if the photodiode is strongly illuminated.

A second photodiode initialization operation is carried out by the MOS transistor at a lower level than the first initialization voltage. In the case of low illumination of the photodiode, this second initialization operation has no influence on the photodiode voltage level. Conversely, in the case of a strong illumination of the photodiode, the photodiode voltage level is initialized to a second initialization voltage lower than the first initialization voltage. The MOS transistor is then disconnected again to start a second short exposure period of the photodiode.

During the various exposure periods of the photodiode, an operation of reading the charge accumulated in the capacitor is carried out via an assembly of follower transistors. Owing to at least two exposure periods of the photodiode, it is thus possible to obtain material information for a photodiode that is weakly, averagely (moderately) or strongly illuminated, which has the effect of extending the dynamic voltage range of the image sensor.

One drawback of the solution proposed in WO 2004/064386 is that the charge storage capacitor is directly placed in parallel with the photodiode. Consequently, at every photodiode reset operation, the capacitor is also initialized or reset to the photodiode voltage level. Several operations to read the voltage value in the capacitor must thus be performed, which complicates the processing of the information provided by each pixel.

It should also be noted that a single initialization transistor is used to initialize the photodiode before each exposure period. Consequently, it is necessary to adjust the gate voltage of the MOS transistor to different voltage levels during the various photodiode initialization operations, which can complicate the manufacture of the image sensor.

SUMMARY OF THE INVENTION

It is thus a main object of the invention to provide a method of obtaining an image using a broad dynamic range image sensor by simple means in order to obtain a well contrasted image at any level of illumination that overcomes the aforecited drawbacks of the prior art. Moreover, the method of obtaining an image enables the electric power consumption of the image sensor to be reduced to a minimum when it is used so that it can be fitted to an instrument of small volume, such as a watch.

The invention therefore concerns, in a first embodiment, a method of obtaining an image using a broad dynamic range image sensor of the aforecited type, made in CMOS type technology, including a photosensitive cell formed of a set of pixels, each pixel including a element for accumulating charge carriers as a function of the level of illumination thereof, a first initialization transistor series connected to the element between two supply terminals of a voltage source, storage means able to be coupled to the element via a second sampling transistor to store a voltage level representative of the charge carriers accumulated by the element, a third initialization transistor series connected to the storage means between the two supply terminals, and fourth and fifth series connected transistors, of which one control terminal of the fourth transistor is connected to the storage means for reading the voltage level stored in the storage means, wherein the method includes a series of steps of: (a) controlling the conduction of the second and third transistors to impose a first initialization voltage on the terminals of the element and the storage means, the first transistor being in a non-conductive state, (b) interrupting the conduction of the second transistor to start a first exposure period in which the element accumulates charge carriers as a function of the illumination level picked up, (c) controlling the conduction of the first transistor to impose a second initialization voltage on the terminals of the element, the second initialization voltage being lower than the first initialization voltage, if the voltage level at the terminals of the element is less than the second initialization voltage at the end of the first exposure period, (d) interrupting the conduction of the first transistor to start a second exposure period in which the element accumulates charge carriers, (e) controlling the conduction of the second transistor after interrupting the conduction of the third transistor during the second exposure period to store the voltage level of the element in the storage means, and (f) reading the voltage level stored in the storage means, when the second transistor is in a non-conductive state, by controlling the conduction of the fourth and fifth transistors.

Advantageous embodiments are defined as follows. In a second embodiment of the present invention, the first embodiment is further modified so that each pixel including an inversely polarised pixel as element, a capacitor as storage means and the five transistors of the n-MOS type, one drain terminal of the first, third and fourth transistors being connected to the high supply terminal of the voltage source, the source terminal of the first transistor being connected to one terminal of the photodiode, the source terminal of the third transistor being connected to a memory node of the capacitor, the drain terminal of the second transistor being connected to the connection node between the first transistor and the photodiode, whereas the source terminal of the second transistor is connected to the memory node of the capacitor, wherein at step (a) of the method, the conduction of the second transistor is controlled by a sampling signal applied across the gate terminal of the second transistor, which is in a high state close to the high voltage of the voltage source, whereas the conduction of the third transistor is controlled by a first initialization signal applied across the gate terminal of the third transistor, which is in a high state close to the high voltage of the voltage source, wherein at step (c) of the method, the conduction of the first transistor is controlled by a second initialization signal applied across the gate terminal of the first transistor, which is in a high state adapted to a voltage level below the high voltage of the voltage source.

In accordance with a third embodiment of the present invention, the first embodiment is further modified so that each pixel includes a control circuit for supplying a second initialization signal to the first transistor whose voltage level is adapted at the high state, the control circuit including a resistive divider with at least two series connected resistors between the high supply terminal and the low supply terminal of the voltage source, at least one switch transistor, whose drain terminal is connected to the connection node of the adjacent resistors and the source terminal is connected to the gate terminal of the first transistor, the switch transistor being controlled by a control signal across the gate terminal thereof to make the transistor conductive or non-conductive, wherein at step (c) of the method, the conduction of the first transistor is controlled by imposing across the gate terminal thereof the voltage present at the connection node of the two adjacent resistors via the switch transistor, which is made conductive by the control signal at the high state close to the high voltage of the voltage source. In accordance with a fourth embodiment of the present invention, the third embodiment is further modified so that the control circuit includes a resistive divider formed of five resistors series connected between the high supply terminal and the low supply terminal of the voltage source, and four switch transistors for connecting each connection node of two adjacent resistors to the gate terminal of the first transistor, only one selected switch transistor being controlled by a control signal to supply the second initialization signal to the first transistor, wherein at step (c) of the method, the conduction of the first transistor is controlled by imposing on the gate terminal thereof the voltage present at a selected connection node of two adjacent resistors via the corresponding switch transistor on the basis of a measurement of a mean illumination level of a previously taken image.

In accordance with a fifth embodiment of the present invention, the first embodiment is further modified so that at step (b), the conduction of the third transistor is interrupted to start the first exposure period of the element, which is a photodiode. In accordance with a sixth embodiment of the present invention, the first embodiment is further modified so that after step (e) and before step (f) of the method, the conduction of the first transistor is controlled to initialize the element, which is a photodiode, to the second initialization voltage lower than the first initialization voltage, the first transistor remaining in a conductive state during part of the duration of the read phase. In accordance with a seventh embodiment of the present invention, the length of the first exposure period of the element, which is a photodiode, is defined to be between 4 to 100 times the length of the second exposure period of the photodiode, preferably 20 times.

One advantage of the method of obtaining an image lies in the fact that the two initialization operations of the element are carried out under the control of two different transistors. The second initialization operation of the element is carried out by operating only the first initialization transistor via a well defined control voltage applied to the control terminal thereof. This enables a second initialization voltage to be provided to the element, such as an inversely polarised photodiode, which is less than the first initialization voltage.

The second initialization voltage can be determined by selecting one voltage level from among several levels of a control circuit which provides the control signal to the control terminal of the first transistor. The various voltage levels of the control circuit are obtained using a resistive divider, which preferably comprises more than two series-connected resistors between the two electric supply terminals of a continuous voltage source of each pixel. The choice of voltage level is obtained via the command of a switch transistor connecting a connection node of two adjacent resistors and the control terminal of the first transistor.

Advantageously, the second exposure period of each element, such as a photodiode, is of much shorter length than the first exposure period so that information is obtained at the end of the two exposure periods both for a strongly illuminated photodiode and a weakly illuminated photodiode. Preferably, the length of the second exposure period is 20 times less than the length of the first exposure period, which means that one can speak of a broad dynamic range image sensor.

BRIEF DESCRIPTION OF THE DRAWINGS

The objects, advantages and features of the method of obtaining an image using a broad dynamic range image sensor will appear more clearly in the following description with reference to the drawings, in which.

DETAILED DESCRIPTION OF THE INVENTION

Figure 1:
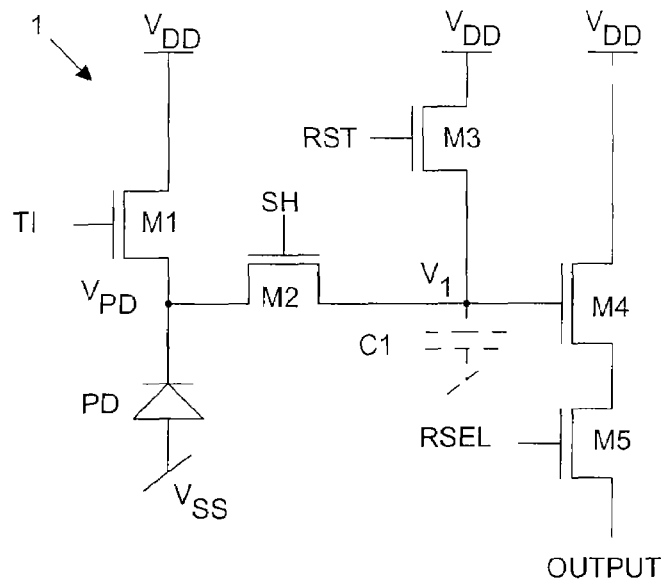
FIG. 1, already cited, shows schematically a known structure of an image sensor pixel for implementing the method according to the invention, FIG. 2, already cited, shows a temporal diagram illustrating the sequence of signals applied to the pixel structure of FIG. 1 and the voltage at the terminals of the storage means and of the element of the prior art.

The method of obtaining an image using a broad dynamic range image sensor will preferably described hereinafter on the basis of a pixel structure as shown in FIG. 1 which was described above. In the embodiment of FIG. 1, the five transistors M1 to M5 are preferably n-MOS transistors made in CMOS technology.

The drain terminal of the first initialization transistor M1 is connected to the high electric supply terminal $V_{DD}$ of a continuous voltage source that is not shown. The source terminal of transistor M1 is connected to a element, which is an inversely polarised photodiode PD connected to low supply terminal $V_{SS}$ of the voltage source. The conduction of transistor M1 is controlled by a control signal TI applied across its gate terminal. The high voltage level of control signal TI can be adapted as explained hereinafter with reference to FIG. 4 as a function of the general illumination level of an image taken by the photosensitive cell of the sensor.

The drain terminal of the second sampling transistor M2 is connected to the connection node of the first transistor M1 and photodiode PD, whereas the source terminal of the second transistor M2 is connected to a terminal of a capacitor C1, acting as storage means. The conduction of this second transistor M2 is controlled by a sampling signal SH applied across its gate terminal. Capacitor C1 can be formed only of p-n junctions through the semiconductor substrate at level of the memory node.

The drain terminal of the third initialization transistor M3 is connected to the high supply terminal $V_{DD}$, whereas its source terminal is connected to a storage node of capacitor C1. The conduction of this third transistor M3 is controlled by a control signal RST applied across its gate terminal.

The drain terminal of the fourth follower transistor M4 is connected to high supply terminal $V_{DD}$. The gate terminal of transistor M4 is connected to the storage node of capacitor C1, whereas its source terminal is connected to the drain terminal of transistor M5. The source terminal of transistor M5 is capable of supplying an output signal OUTPUT across an output bus common to all of the pixels in one column of the matrix of the photosensitive cell. The voltage level stored by the capacitor is read by the conduction of transistor M5 using a row selection signal RSEL applied across its gate terminal.

All of the gate terminal control signals of the five transistors M1 to M5 are controlled by a microprocessing unit of the image sensor which is not shown in the drawings. The description does not provide any information as to the way in which the signals are processed by the microprocessor unit, since this forms part of the general knowledge of those skilled in this technical field.

It should be noted that the method can be applied in a similar manner to any other type of pixel structure, which includes an arrangement of five transistors M1 to M5, a element PD and storage means C1 of another type. The transistors may be p-MOS transistors and the photodiode PD may be connected to the high supply terminal $V_{DD}$ of the voltage source. Other types of transistors, such as bipolar transistors may also be envisaged. However, these bipolar transistors consume more electric energy than the MOS transistors shown in FIG. 1. Consequently, they are not suited to making an image sensor that can be fitted to a portable instrument of small size, such as a wristwatch.

Figure 3:
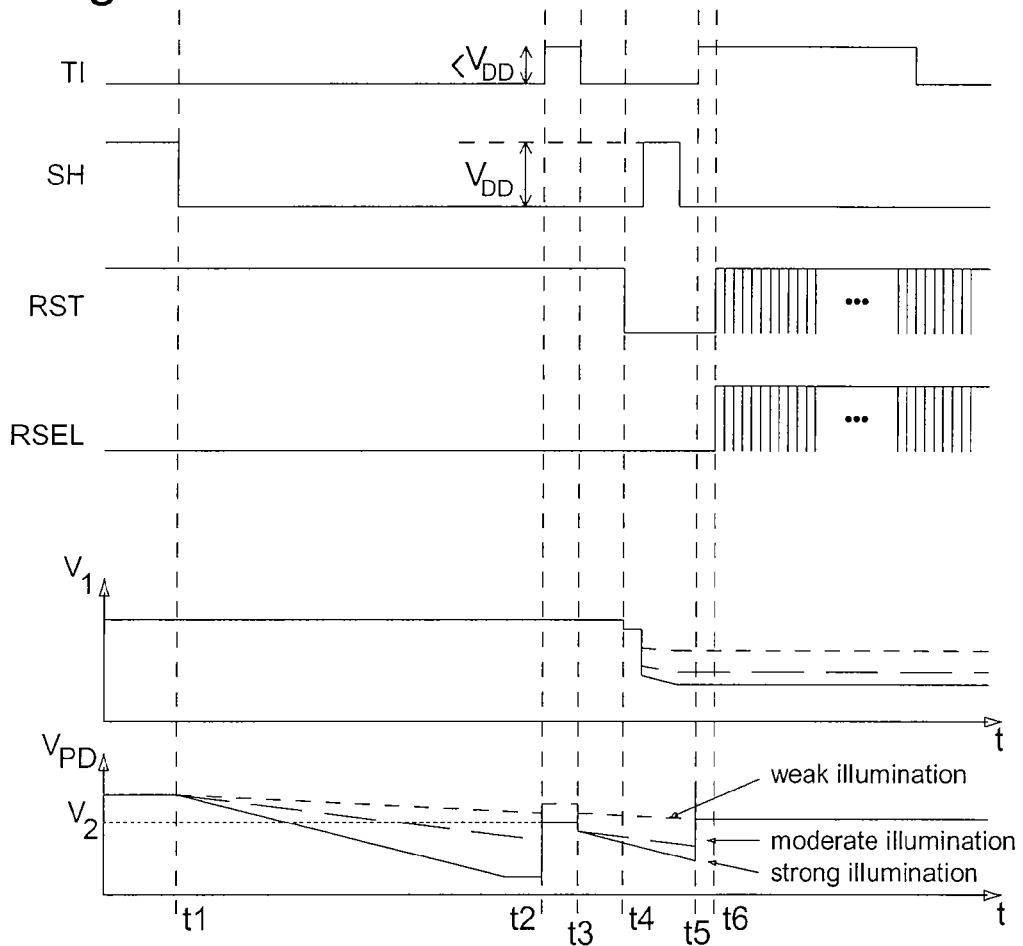
FIG. 3 shows a temporal diagram illustrating the sequence of signals applied to the pixel structure of FIG. 1 during at least two exposure periods and the voltage at the terminals of the storage means and the element of the method according to the invention.

In FIG. 3, the various steps of the method for obtaining an image using a broad dynamic range sensor will now be described with reference to the pixel structure of FIG. 1. In order to simplify the description of the steps of the method for obtaining an image, the various time periods of each phase are not indicated exactly in FIG. 3. The exposure periods of the photodiodes of the photosensitive cell of the image sensor are generally adapted as a function of a mean illumination level of an image to be sensed. The first exposure period can be defined between 35 µs and 5 s depending upon the mean illumination level.

Each photodiode and each capacitor is firstly initialized generally on the pixels of the image sensor at the start of the image taking operations. In order to do this, the sampling signal SH, and the first initialization control signal RST, which are applied across the gate terminals respectively of transistors M3 and M2 shown in FIG. 1, are in a high state close to high voltage $V_{DD}$ of the continuous voltage supply source of the pixels. In this high state, the second sampling transistor and the third initialization transistor are in a conductive state. A first initialization voltage close to $V_{DD}$ is thus imposed on the photodiode, as shown in diagram $V_{PD}$, and on the capacitor, as shown by the diagram $V_1$. In the first initialization phase, the control signal TI from the gate terminal of the first initialization transistor M1, is in a low state close to the low voltage $V_{SS}$ of the voltage source in order to make the first transistor non-conductive. The follower transistors M4 and M5 for reading information stored in the capacitor are also in a non-conductive state.

A first exposure period of each photodiode starts at time t1. In order to do this, sampling signal SH passes to the low state in order to make the second sampling signal non-conductive and to uncouple the photodiode from the capacitor. Each photodiode initially charged at a first initialization voltage close to $V_{DD}$ accumulates field carriers, i.e. picks up a certain quantity of photons representative of a determined illumination level. Consequently, the photodiode is gradually discharged during the first exposure period, in accordance with a gradient that is a function of its illumination.

In the case of strong illumination, the photodiode is quickly discharged to a minimum voltage value of the dynamic range prior to the end of the first exposure period as shown by the curve in a full line in the diagram of voltage $V_{PD}$. This represents a state of saturation of the photodiode for which a loss of information from the strongly illuminated pixel can be observed. However, in the case of weak or average (moderate) illumination, the photodiode is gradually discharged during the entire length of the first exposure period to time t2 without reaching the minimum voltage value as shown by the curves in dotted lines.

At the end of the first exposure period at time t2, a second reset or initialization operation is carried out for each photodiode via the first initialization transistor M1 of FIG. 1 alone. This first transistor works in saturated mode above its threshold voltage. In order to do this, initialization signal TI passes to the high state at a voltage lower than $V_{DD}$ for a very short time interval at instant t2 and until time t3. This very short time interval of the second photodiode initialization prevents the introduction of spatial information interference into the image picked up. The voltage level at the high state of initialization signal TI to make the first transistor conductive can be selected as described hereinafter with reference to FIG. 4.

Given that the gate voltage of the first transistor is adjusted to a level lower than voltage $V_{DD}$, the second photodiode initialization voltage $V_2$ is defined as being lower than the first initialization voltage close to $V_{DD}$ according to a main feature of the method according to the invention. The photodiode voltage level is thus returned to this second voltage $V_2$ for a strongly or averagely illuminated photodiode, as shown in FIG. 3. However, in the case of weak illumination of the photodiode, the voltage level remains higher than this second initialization voltage $V_2$. This voltage level remains constant during the short initialization period from t2 to t3, but with a slight increase in the photodiode voltage level, due to positive charges in the channel of the first transistor, which are injected in part towards $V_{DD}$ and in part towards the photodiode.

A second exposure period for each photodiode starts at time t3, in which the first transistor is made non conductive by the initialization signal TI passing to the low state close to low voltage $V_{SS}$. From this instant, each photodiode is discharged from the voltage level defined during the second initialization as a function of its illumination level, and until time t5. The second exposure period is defined as being much shorter than the first exposure period, for example in a ratio of 1:20 so that each strongly illuminated photodiode does not reach the minimum saturation voltage level. This ratio can be defined between 1:4 and 1:100. In this manner, it is possible to obtain specific information at the end of the two exposure periods both for a strongly illuminated photodiode and for an averagely or weakly illuminated photodiode. A well contrasted image can thus be obtained by the image sensor at any illumination level owing to the method according to the invention.

During the second exposure period, the voltage value of photodiode $V_{PD}$ has to be stored in the capacitor. In order to do this, the initialization signal RST, which is applied to the gate terminal of the third transistor, must first of all pass from a high state to a low state at time t4. The third transistor thus becomes non-conductive at time t4 in order to release the capacitor previously kept at a first initialization voltage close to $V_{DD}$ as shown in diagram V1. The second sampling transistor then has to be made briefly conductive towards the end of the second sampling period between time t4 and time t5. Sampling signal SH, which is imposed at the gate terminal of the second transistor, thus has to pass briefly from a low state to a high state close to voltage $V_{DD}$. While the second transistor is in a conductive state, charges are transferred from the photodiode to the capacitor. This allows the photodiode voltage value to be stored in the capacitor as soon as the sampling signal SH passes to the low state again.

The voltage value stored in each capacitor provides specific information as a function of the illumination level picked up by each photodiode during the entire duration of the exposure periods. Owing to this dual exposure corresponding to a broad dynamic range sensor, it is possible to obtain a well contrasted image at any illumination level.

Prior to an operation of reading the voltage value stored in each capacitor, each photodiode is initialized again to the second initialization voltage at time t5. In order to do this, initialization signal TI passes from the low state to the high state, the voltage level of which is adapted to be less than $V_{DD}$, in order to make the first transistor conductive. The voltage value stored in the capacitor of each pixel is therefore not disturbed by the phenomenon of charge carrier diffusion. The voltage value present in the capacitor therefore remains constant.

At time t6, an operation of reading the voltage value stored in each capacitor can start. This read operation is carried out in accordance with a well known technique as also explained in EP Patent No. 1 128 661 whose description relating to this operation is incorporated here by reference. In order to do this, a row selection signal RSEL is applied row by row during the read process across the gate terminal of each fifth transistor M5 of FIG. 1. During the read operation, initialization signal TI of the first transistor can be brought to the low state to make the first transistor non-conductive. In this manner, after the read operation, a new image taking operation can be carried out.

Figure 4:
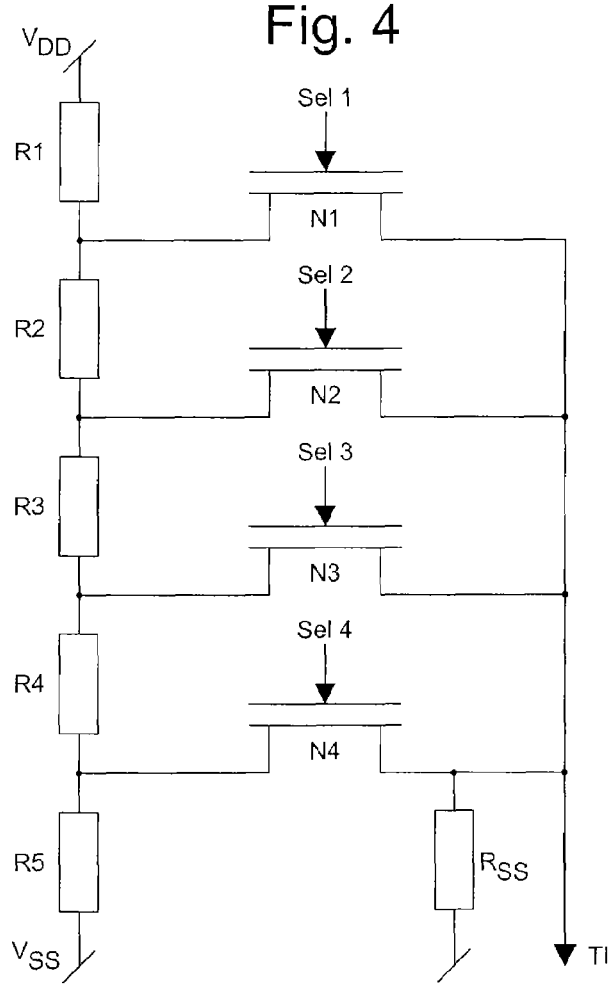
FIG. 4 shows a control circuit of an initialization transistor of a pixel of the image sensor for implementing the method according to the invention.
Figure 2:
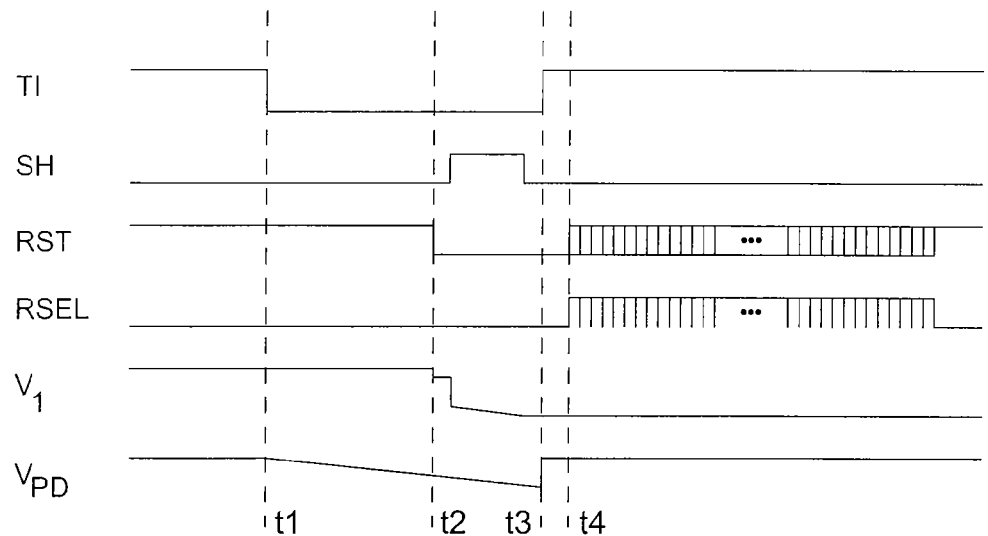

FIG. 4 shows a control circuit able to provide a well defined initialization signal TI to the gate terminal of the first initialization transistor of a pixel structure of FIG. 1 for implementing the method according to the invention. The voltage applied to the gate terminal of the first initialization transistor to be made conductive has to be adapted to a value lower than the first initialization voltage close to $V_{DD}$ so as to reset or initialize the photodiode before the second exposure period. The supply voltage $V_{DD}$ is for example equal to 2.5 V for a sensor that is made in TSMC technology at 0.25 µm. In order to do this, the circuit includes a resistive divider, which is formed of at least two series connected resistors between the supply terminals $V_{DD}$ and $V_{SS}$. In this example, the resistive divider includes 5 series connected resistors R1 to R5, the value of each resistor being selected to have several levels of continuous voltage well suited to the second photodiode initialization.

The value of resistor R5 may be for example equal to the sum of the value of four resistors R1 to R4, which each have the same value. In this case, for a supply voltage $V_{DD}$ equal to 2.5 V, the voltage at the connection node between the resistors R4 and R5, which is connected to the drain terminal of an n-MOS type switch transistor N4, is equal to 1.25 V. The voltage at the connection node between resistors R3 and R4, which is connected to the drain terminal of an n-MOS type switch transistor N3, is equal to 1.56 V. The voltage at the connection node between resistors R2 and R3, which is connected to the drain terminal of an n-MOS type switch transistor N2, is equal to 1.87 V. Finally, the voltage at the connection node between resistors R1 and R2, which is connected to the drain terminal of an n-MOS type switch transistor N1, is equal to 2.18 V.

The source terminals of transistors N1, N2, N3 and N4 are connected in common to the gate terminal of the first transistor, which is not shown in FIG. 4. In accordance with conventionally performed programming in a microprocessor unit of the image sensor, only one of the four transistors N1, N2, N3 and N4 is controlled across its gate terminal by a control signal Sel 1, Sel 2, Sel 3 or Sel 4 to supply initialization signal TI.

Each control signal Sel 1, Sel 2, Sel 3 or Sel 4 of a switch transistor N1, N2, N3 or N4 is of equivalent shape to control signal TI of the gate terminal of the first transistor. When the control signal of the switch transistor selected N1, N2, N3 or N4 is at the high state close to $V_{DD}$ via electronic simplification to make the switch transistor conductive, the voltage present at the connection node of two resistors, which is connected to the selected switch transistor, is supplied to the gate terminal of the first transistor. In this manner, the first initialization transistor of the photodiode is easily made conductive by a suitable gate voltage by the control circuit to obtain a second desired initialization voltage of the photodiode. A resistor $R_{SS}$, which is connected between the gate terminal of the first transistor and the low voltage terminal $V_{SS}$, easily allows the first transistor to pass into a non-conductive state, when the control signal of the selected switch transistor is in the low state.

From the description that has just been given, those skilled in the art can devise multiple variants of the method of obtaining an image using a broad dynamic range image sensor without departing from the scope of the invention defined by the claims. More than two exposure periods for each photodiode can be envisaged to obtain an image while carrying out the first initialization using the third transistor and the second or following initialization using the first transistor. The second initialization voltage of each photodiode can easily be changed from one image to another using the control circuit as a function of the illumination level.

What is claimed is:

1. A method of obtaining an image using a broad dynamic range image sensor, made in CMOS type technology, including a photosensitive cell formed of a set of pixels, each pixel including a photodetector element for accumulating charge carriers as a function of the level of illumination thereof, a first initialization transistor series connected to the photodetector element between two supply terminals of a voltage source, storage means able to be coupled to said photodetector element via a second sampling transistor to store a voltage level representative of said charge carriers accumulated by said photodetector element, a third initialization transistor series connected to the storage means between the two supply terminals, and fourth and fifth series connected transistors, of which one control terminal of the fourth transistor is connected to the storage means for reading the voltage level stored in the storage means, wherein the method includes a series of steps of:

a) controlling the conduction of the second and third transistors to impose a first initialization voltage on the terminals of the photodetector element and the storage means, the first transistor being in a non-conductive state;

b) interrupting the conduction of the second transistor to start a first exposure period in which the photodetector element accumulates charge carriers as a function of the illumination level picked up;

c) controlling the conduction of the first transistor to impose a second initialization voltage on the terminals of the photodetector element, the second initialization voltage being lower than the first initialization voltage, if the voltage level at the terminals of the photodetector element is less than the second initialization voltage at the end of the first exposure period;

d) interrupting the conduction of the first transistor to start a second exposure period in which the photodetector element accumulates charge carriers;

e) controlling the conduction of the second transistor after interrupting the conduction of the third transistor during the second exposure period to store the voltage level of the photodetector element in the storage means; and f) reading the voltage level stored in the storage means, when the second transistor is in a non-conductive state, by controlling the conduction of the fourth and fifth transistors.

2. The method according to claim 1, each pixel including an inversely polarised pixel as photodetector element, a capacitor as storage means and the five transistors of the n-MOS type, one drain terminal of the first, third and fourth transistors being connected to the high supply terminal of the voltage source, the source terminal of the first transistor being connected to one terminal of the photodiode, the source terminal of the third transistor being connected to a memory node of the capacitor, the drain terminal of the second transistor being connected to the connection node between the first transistor and the photodiode, whereas the source terminal of the second transistor is connected to the memory node of the capacitor, wherein at step a) of the method, the conduction of the second transistor is controlled by a sampling signal applied across the gate terminal of the second transistor, which is in a high state close to the high voltage of the voltage source, whereas the conduction of the third transistor is controlled by a first initialization signal applied across the gate terminal of the third transistor, which is in a high state close to the high voltage of the voltage source, wherein at step c) of the method, the conduction of the first transistor is controlled by a second initialization signal applied across the gate terminal of the first transistor, which is in a high state adapted to a voltage level below the high voltage of the voltage source.

3. The method according to claim 1, wherein each pixel includes a control circuit for supplying a second initialization signal to the first transistor whose voltage level is adapted at the high state, said control circuit including a resistive divider with at least two series connected resistors between the high supply terminal and the low supply terminal of the voltage source, at least one switch transistor, whose drain terminal is connected to the connection node of the adjacent resistors and the source terminal is connected to the gate terminal of the first transistor, the switch transistor being controlled by a control signal across the gate terminal thereof to make the transistor conductive or non-conductive, wherein at step c) of the method, the conduction of the first transistor is controlled by imposing across the gate terminal thereof the voltage present at the connection node of the two adjacent resistors via the switch transistor, which is made conductive by the control signal at the high state close to the high voltage of the voltage source.

4. The method according to claim 3, wherein the control circuit includes a resistive divider formed of five resistors series connected between the high supply terminal and the low supply terminal of the voltage source, and four switch transistors for connecting each connection node of two adjacent resistors to the gate terminal of the first transistor, only one selected switch transistor being controlled by a control signal to supply the second initialization signal to the first transistor, wherein at step c) of the method, the conduction of the first transistor is controlled by imposing on the gate terminal thereof the voltage present at a selected connection node of two adjacent resistors via the corresponding switch transistor on the basis of a measurement of a mean illumination level of a previously taken image.

5. The method according to claim 1, wherein at step b), the conduction of the third transistor is interrupted to start the first exposure period of the photodetector element, and wherein the photodetector element is a photodiode.

6. The method according to claim 1, wherein after step e) and before step f) of the method, the conduction of the first transistor is controlled to initialize the photodetector element to the second initialization voltage lower than the first initialization voltage, the first transistor remaining in a conductive state during part of the duration of the read phase, and wherein the photodetector is a photodiode.

7. The method according to claim 1, wherein the photodetector element is a photodiode and the length of the first exposure period of the photodetector element, which is a photodiode, is defined to be between 4 to 100 times the length of the second exposure period of the photodiode.

8. The method according to claim 1, wherein the photodetector element is a photodiode and the length of the first exposure period of the photodetector element is defined to be 20 times the length of the second exposure period of the photodiode.

* * * * *